Patented May 26, 1953

2,639,970

UNITED STATES PATENT OFFICE 2,639,970

TREATMENT OF POLYVINYL ALCOHOL FIBERS BY DIELECTRIC HEATING

Tsukumo Tomonari, Osaka, Japan, assignor of one-fourth to Omni Products Corporation, New York, N. Y., a corporation of New York Application April 8, 1950, Serial No. 154,874
In Japan December 10, 1949

2 Claims. (Cl. 18—54)

This invention relates to the treatment of polyvinyl alcohol fibers, and has for its object to improve the water and heat-resisting characteristics of polyvinyl alcohol fibers.

In dielectric heating, the absorbed electric power per unit volume (P) is represented by the following equation:

$$P = \frac{5}{9} E^2 \cdot f \cdot \epsilon \cdot \tan \delta$$

where, $E$: intensity of electric field
$f$: frequency
$\epsilon$: dielectric constant
Tan $\delta$: dielectric loss angle The absorbed electric power increases in proportion to the square of the intensity of electric field, the frequency, $\epsilon$ and tan $\delta \cdot \epsilon$ and tan $\delta$ are a function of temperaure.

Figure 1:
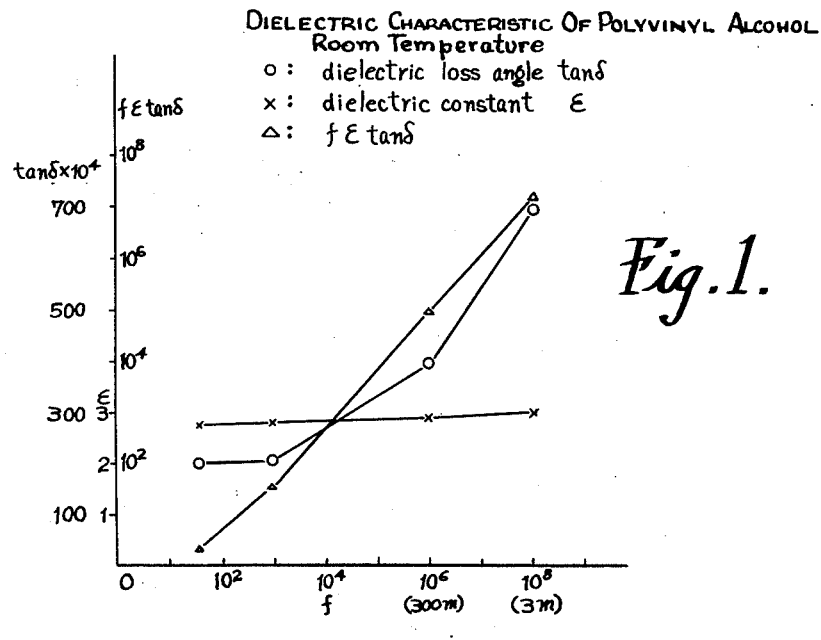
Figure 2:
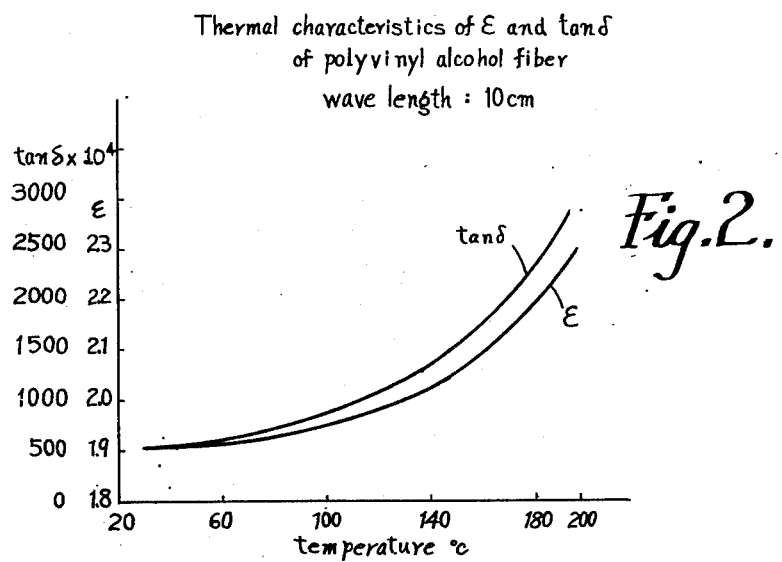

The present invention is based on the fundamental study of the dielectric characteristics of polyvinyl alcohol, and will be better understood with reference to the accompanying drawings, in which Fig. 1 is a graph showing the dielectric characteristics of polyivnyl alcohol as a function of the applied frequency, and Fig. 2 shows the dielectric constant $\epsilon$ and tan $\delta$ curves as a function of the temperature.

The inventor has ascertained that $\epsilon$ increases slightly and tan $\delta$ rapidly and accordingly $f \cdot \epsilon \cdot$ tan $\delta$ increases also rapidly with increasing frequency, as shown in Figure 1. Therefore, the higher the frequency is, the larger the absorbed electric power becomes, even at lower voltages. By application of the dielectric heating to polyvinyl alcohol fibers which contain salts of the coagulating bath after being dried, the discharging voltage will be lowered as a consequence of the presence of salts. In order to heat effectively at a low field intensity, it is necessary to use a micro wave such as 1 meter or some tens centimeters, whereby the treatment can proceed smoothly, but this is industrially uneconomical. In the study of the thermal characteristics of $\epsilon$ and tan $\delta$ of polyvinyl alcohol fibers, it has been discovered that $\epsilon$ and tan $\delta$ increase rapidly with increasing temperature as shown in Figure 2, so that it is made clear that a high temperature of the fibers is very effective for dielectric heating. In this case, that is, if the fiber is heated to some proper temperature before application of high frequency, a long wave such as 20 meters becomes effectively available at low field intensity.

According to the above mentioned studies, the present invention is characterized in that dielectric heating is applied to the polyvinyl alcohol fibers while they are preheated by hot air, superheated steam, etc. at a suitable high temperature. By this method, no electric discharge occurs between either fibers themselves nor fibers and electrode, thus the effect of heating is achieved evenly and in a short time.

The polyvinyl alcohol fibers thus heat-treated by dielectric heating combined with preheating show such a remarkable increase of the softening point in water as to make the fibers suitable for general use in the textile industry. Subsequently, the fibers may be treated with an aldehyde containing medium. If 25-75% of the hydroxyl groups of the polyvinyl alcohol are acetalized, the softening temperature in water at which temperature the fibers shrink 10% of the original length, can be still further raised. The products which had the softening temperature above 75-80° C. and then were acetalized, have the superior characteristics of pure white, water and heat resistant fibers. They do not shrink even in boiling water.

The following examples are now given as illustrative but not limitative of the invention.

Example 1

A tow of polyvinyl alcohol fibers of 50,000 deniers (single filament 2 deniers) is treated by this method continuously under following conditions.

Temperature of hot air in chamber in which
   the fibers are dielectrically heated __°C__ 181
Wave length _____meters__ 20
Input of electric power:
   Anode voltage _____v__ 1600
   Anode current _____mA__ 590
Time treated through the electrodes _____seconds__ 75

The results are indicated as the following softening temperature.

Softening temperature of the treated products in water _____°C__ 82.2
Softening temperature of the products which was treated under the same conditions only by hot air without dielectric heating (as comparison) _____°C__ 27

Example 2

A tow such as Example 1 is treated similarly under following conditions.

Temperature of hot air in chamber ___°C__ 200
Wave length _____meters__ 20

Input of electric power:
  Anode voltage _____ v__ 1800
  Anode current _____ mA__ 670
Time treated through the electrodes _____ seconds__ 50

The results are as follows:

Softening temperature of the treated products in water _____ °C__ 82
Softening temperature of the product which was treated under the same conditions only by hot air without dielectric heating (as comparison) _____ °C__ 46

Example 3

A tow such as Example 1 is treated similarly under following conditions.

Temperature of hot air in chamber ____ °C__ 210
Wave length _____ meters__ 20
Input of electric power:
  Anode voltage _____ v__ 1900
  Anode current _____ mA__ 730
Time treated through the electrodes seconds__ 36

The results are as follows:

Softening temperature of the treated products in water _____ °C__ 34.5
Softening temperature of the product which was treated under the same conditions only by hot air without dielectric heating (as comparison) _____ °C__ 33.5

Example 4

A tow of polyvinyl alcohol fibers of 20,000 deniers is treated by this method continuously under following conditions:

Temperature of hot air in chamber ____ °C__ 215
Wave length _____ meters__ 3.2
Input of anode _____ watts__ 65
Time treated through the electrode seconds__ 20

The results are as follows:

Softening temperature of the treated products in water _____ °C__ 90.6

Softening temperature of the product which was treated under the same conditions only by hot air during 30 seconds, without dielectric heating (as comparison) _____ °C__ 59

Example 5

A tow of polyvinyl alcohol fibers of 40,000 deniers is treated by this method continuously under following conditions:

Temperature of hot air in the additional preheating chamber _____ °C__ 200
Time heated in the chamber _____ seconds__ 60
Temperature of hot air in chamber in which the fibers are dielectrically heated ____ °C__ 201
Wave length _____ meters__ 20
Input of electric power:
  Anode voltage _____ v__ 1950
  Anode current _____ mA__ 700
Time treated through the electrodes seconds__ 11

The results are as follows:

Softening temperature of the treated products in water _____ °C__ 82

Softening temperature of the product which was treated under the same conditions only by hot air without dielectric heating (as comparison) _____ Below room temperature

Example 6

A tow such as Example 5 is treated similarly under following conditions:

Temperature of hot air in the additional preheating chamber _____ °C__ 209
Time heated in the chamber _____ seconds__ 30
Temperature of hot air in chamber _____ °C__ 210
Wave length _____ meters__ 20
Input of electric power:
  Anode voltage _____ v__ 1850
  Anode current _____ mA__ 650
Time treated through the electrodes seconds__ 16

The results are as follows:

Softening temperature of the treated products in water _____ °C__ 81
Softening temperature of the product which was treated under the same conditions only by hot air at 210° C. during 45 seconds, without dielectric heating (as comparison) _____ °C__ 37.5

Example 7

A tow such as Example 5 is heated similarly under following conditions:

Temperature of hot air in the additional preheating chamber _____ °C__ 225
Time heated in the chamber _____ seconds__ 30
Temperature of hot air in chamber _____ °C__ 225
Wave length _____ meters__ 20
Input of electric power:
  Anode voltage _____ v__ 1900
  Anode current _____ mA__ 640
Time treated through the electrodes seconds__ 6

The results are as follows:

Softening temperature of the treated products in water _____ °C__ 80
Softening temperature of the product which was treated under the same conditions only by hot air at 225° C. during 40 seconds, without dielectric heating (as comparison) _____ °C__ 52

Example 8

A tow of polyvinyl alcohol fibers of 20,000 deniers is treated by this method continuously under following conditions:

Temperature of hot air in the additional preheating chamber _____ °C__ 215
Time heated in the chamber _____ seconds__ 30
Temperature of hot air in chamber ____ °C__ 215
Wave length _____ meters__ 3.2
Input of anode:
  Anode voltage _____ v__ 1900
  Anode current _____ mi__ 640
Time treated through the electrodes seconds__ 8

The results are as follows:

Softening temperature of the treated products in water _____ °C__ 89.8
Softening temperature of the product which was treated under the same conditions only by hot air at 215° C. during 40 seconds, without dielectric heating _____ °C__ 65

Any variation of or modification of the invention as it has been described above in this application which conforms to the spirit of the invention is intended to be included within the scope of the claims.

Having thus described my invention, what I claim as new and desire to secure by Letters Patent of the United States is:

1. A method of preparing water resistant polyvinyl alcohol fibers comprising the steps of extruding an aqueous solution of polyvinyl alcohol through the orifices of a spinneret into a coagulating salt solution to form a tow of polyvinyl alcohol filaments, heating said tow of filaments by means of a hot gaseous medium, and subjecting said tow of heated filaments, while still containing adhered thereto salt from said solution, for a short period of time to a high frequency field of a wave length of the order of magnitude of about 20 m.

2. A method of preparing water resistant polyvinyl alcohol fibers comprising the steps of extruding an aqueous solution of polyvinyl alcohol through the orifices of a spinneret into a coagulating salt solution to form a tow of polyvinyl alcohol filaments, heating for about 30–60 seconds said tow of filaments in a gaseous medium having a temperature of about 180–225° C., and applying to said heated tow for about 6 to 60 seconds a high frequency field of a voltage of about 1600–2000 v. and a wave length of about 3 to 20 m.

TSUKUMO TOMONARI.

References Cited in the file of this patent

UNITED STATES PATENTS

| Number | Name | Date |
| --- | --- | --- |
| 2,130,212 | Watkins | Sept. 13, 1938 |
| 2,236,061 | Izard et al. | Mar. 25, 1941 |
| 2,385,567 | Desearsin | Sept. 25, 1945 |

FOREIGN PATENTS

| Number | Country | Date |
| --- | --- | --- |
| 386,161 | Great Britain | Jan. 12, 1933 |
| 393,488 | Great Britain | June 8, 1933 |

OTHER REFERENCES

Rayon Textile Monthly, Feb. 1941, pages 49 (85) and 50 (86).

Electronic Industries, Feb. 1945, page 87.

Journal of Scientific Instruments, Aug. 1946, vol. 23, pages 165–172 inclusive.